(12) United States Patent
Shin

(10) Patent No.: US 7,105,115 B2
(45) Date of Patent: Sep. 12, 2006

(54) MANUFACTURING METHOD OF EXPANDED GRAPHITE PRODUCTS

(75) Inventor: Young Woo Shin, Yeosu-si (KR)

(73) Assignee: Takumispirit Corporation, Yosu (KR)

( * ) Notice: Subject to any disclaimer, the term of this patent is extended or adjusted under 35 U.S.C. 154(b) by 19 days.

(21) Appl. No.: 10/508,016

(22) PCT Filed: Mar. 29, 2004

(86) PCT No.: PCT/KR2004/000712

§ 371 (c)(1),
(2), (4) Date: Sep. 24, 2004

(87) PCT Pub. No.: WO2004/087572

PCT Pub. Date: Oct. 14, 2004

(65) Prior Publication Data

US 2005/0164003 A1    Jul. 28, 2005

(30) Foreign Application Priority Data

Mar. 31, 2003 (KR) .................... 10-2003-0020202
Mar. 12, 2004 (KR) .................... 10-2004-0016839

(51) Int. Cl.
*B29C 43/18* (2006.01)
*B29C 43/02* (2006.01)

(52) U.S. Cl. .................... 264/112; 264/115; 264/120

(58) Field of Classification Search .................... None
See application file for complete search history.

(56) References Cited

U.S. PATENT DOCUMENTS 5,194,198 A * 3/1993 von Bonin et al. ........... 264/42
6,673,289 B1 * 1/2004 Reynolds et al. ........... 264/115

* cited by examiner

*Primary Examiner*—Mary Lynn Theisen
(74) *Attorney, Agent, or Firm*—Shlesinger, Arkwright & Garvey LLP

(57) ABSTRACT

Disclosed herein is a method of manufacturing expanded graphite products. The method comprises the steps of a) compressing expanded graphite to form a graphite thin film, b) milling the graphite thin film to form graphite flakes, and c) placing the graphite flakes in a mold and compressing the graphite flakes to form a predetermined shape, wherein during at least any one of the steps a), b) and c), a binder is mixed with the expanded graphite. There are provided advantageous effects that as the density of the expanded graphite product increases through respective manufacturing steps, not only are initial equipment costs reduced due to minimized equipment, but also an expanded graphite product having a uniform density and a closely packed structure is provided. Additionally, since the expanded graphite product is finally compressed in the mold, the expanded graphite product does not have directional preference and can be formed into various shapes.

9 Claims, 4 Drawing Sheets

MANUFACTURING METHOD OF EXPANDED GRAPHITE PRODUCTS

TECHNICAL FIELD

The present invention relates to a method of manufacturing an expanded graphite product, and more particularly to a method of manufacturing an expanded graphite product, in which after expanded graphite powder is compressed into flakes, the flakes are compressed in a mold to produce the expanded graphite product.

BACKGROUND ART

In general, graphite is a raw material formed of overlapped layers of planar macromolecules, in which hexagonal rings consisting of carbon atoms are infinitely connected with each other while forming sheets. Including good electric conductivity, the graphite has lubricant properties and flexibility contributed to a lamella structure of the macromolecule (polycene). Further, although the graphite is easy to break, it has a low reactivity since it is a macromolecule.

Since the carbon sheets of the graphite having the polycene structure are joined to each other by van der Waals forces, the distance of 14.2 nm between the carbon sheets is larger than the distance of 35.5 nm between the carbon atoms. Thus, an intercalation compound can be formed by insertion of other atoms into a gap between the carbon sheets. Specifically, with a net plane of the graphite crystal maintained, a great quantity of atoms, molecules or ions are inserted into the gap between the sheets, thereby forming the intercalation compounds.

That is, when an intercalation compound or remnant compound with an acid, such as sulphuric acid, applied between the sheets of the graphite is rapidly heated to a temperature of about 1000° C., the acid between the sheets is vaporized to generate gas, and the interlayer of the graphite expands dozens or hundreds of times due to an expansion pressure of the gas, thereby forming the intercalation compound, what is so referred to as "expanded graphite."

A conventional method of manufacturing expanded graphite products will now be described with reference to FIG. 1.

First, since the expanded graphite has a density $1/50 \sim 1/200$ times smaller than that of a general graphite, expanded graphite is laminated to a predetermined height, considering a thickness and a density of an expanded graphite sheet to be formed with expanded graphite (S2). For example, when forming a 5 mm thick expanded graphite sheet using expanded graphite of a density $1/200$ times smaller than that of the general graphite, expanded graphite is laminated to a height 200 times or more of 5 mm.

Then, expanded graphite laminated to a predetermined thickness is compressed with a high capacity press (S4) and rolled with a roller, to form a high density, expanded graphite sheet (S6). The expanded graphite sheet is formed into a desired shape through additional mechanical processes, such as cutting or shaping, (S8), completing the manufacturing process for the expanded graphite product (S10).

However, the conventional method of manufacturing the expanded graphite products has problems in that as the expanded graphite products increase in thickness, expanded graphite should be laminated higher when manufacturing the expanded graphite product, thereby not only increasing the capacity of a press, but also making equipments huge due to requirement of continuous rolling equipment. Further, expanded graphite having a considerably low density is compressed, rolled and formed in a great quantity, so that it is very difficult to increase the density and to achieve a uniform density.

Further, according to the conventional method, expanded graphite of the considerably low density is compressed, rolled and formed in a great quantity, so that space in expanded graphite is not completely removed. Thus, not only does expanded graphite have a non-closely packed structure so that mechanical properties, such as tensile strength, compression strength, hardness or the like, are poor, but also does expanded graphite have a directional preference due to the compression process and may be formed only into the sheet shape, so that a final shape is restricted.

DISCLOSURE OF THE INVENTION

The present invention has been made to solve the above problems, and it is an object of the present invention to provide a method of manufacturing expanded graphite products, which can reduce required press capacity, improve mechanical properties and form various shapes.

In accordance with an aspect of the present invention, the above and other objects can be accomplished by the provision of a method of manufacturing expanded graphite products, comprising the steps of: a) compressing expanded graphite to form a graphite thin film; b) milling the graphite thin film to form graphite flakes; and c) placing the graphite flakes in a mold and compressing the graphite flakes to form a predetermined shape, wherein a binder is mixed into the expanded graphite, during at least one of the steps a), b) and c).

The binder may be at least one of a polymer-based binder, ceramic-based binder and phosphate-based binder.

The polymer-based binder may further comprise a conductive material.

A fibrous material, such as carbon fiber, Kevlar or the like, may be further added to the graphite flakes in the mold during the step c).

At least one or more metallic sheets may further be interposed in the graphite flakes in the mold in the direction of compression during the step c).

The metallic sheets may be formed with at least one or more holes or uneven portions.

In accordance with the method of manufacturing the expanded graphite product of the present invention, expanded graphite is primarily processed into flakes and the flakes are formed into a product, so that a high-density expanded graphite product can be manufactured with relatively small equipment. As a result, there are provided advantageous effects that not only initial equipment costs can be reduced, but also an expanded graphite product having a uniform density and a closely packed structure can be provided. Additionally, since the expanded graphite product is finally compressed in the mold, the expanded graphite product does not have directional preference and can be formed into various shapes.

Further, the polymer-based binder, ceramic-based binder and phosphate-based binder can be used in the present invention, so that the shape of the expanded graphite product can be maintained after forming. Particularly, in the case of the polymer-based binder, there is provided an advantageous effect in that not only does the polymer-based binder have excellent water resistance, but also it can be used for products requiring conductivity by mixing nanosize conductive powder therewith.

Further, the expanded graphite product can have enhanced mechanical properties by mixing the fibrous material, such as carbon fiber, Kevlar or the like, into the graphite flakes in the mold.

Further, the expanded graphite product can have enhanced mechanical properties by compressing the graphite flakes in a state that the metallic sheet for reinforcement is interposed in the graphite flakes.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the accompanying drawings so that those skilled in the art may easily understand and repeat the present invention.

FIGS. 2 to 6 are diagrams illustrating steps of a method of manufacturing an expanded graphite product according to the present invention.

The method of manufacturing the expanded graphite product according to the present invention will now be described.

Figure 1:
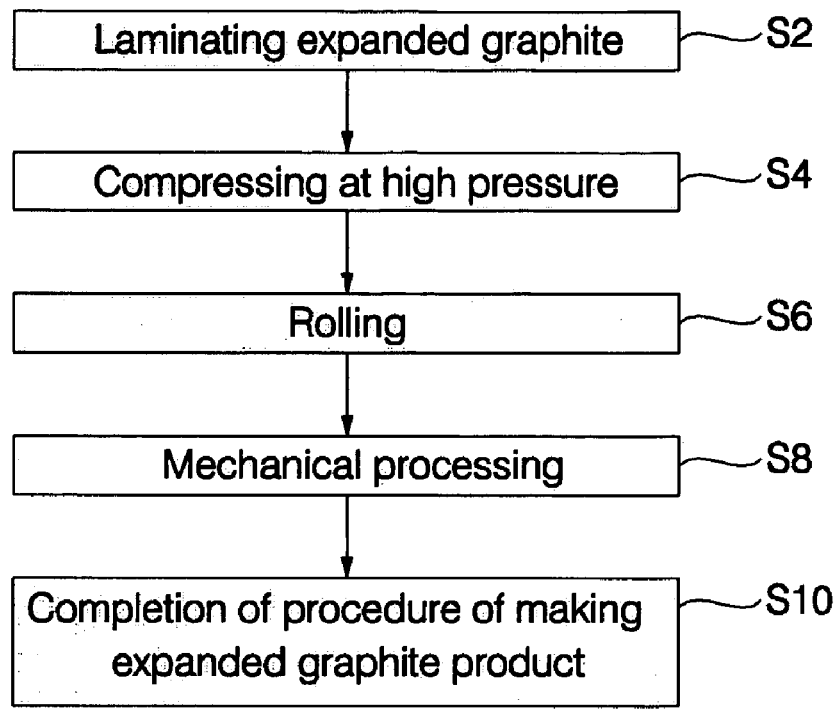
FIG. 1 is a flow chart of a conventional method of manufacturing an expanded graphite product.
Figure 2:
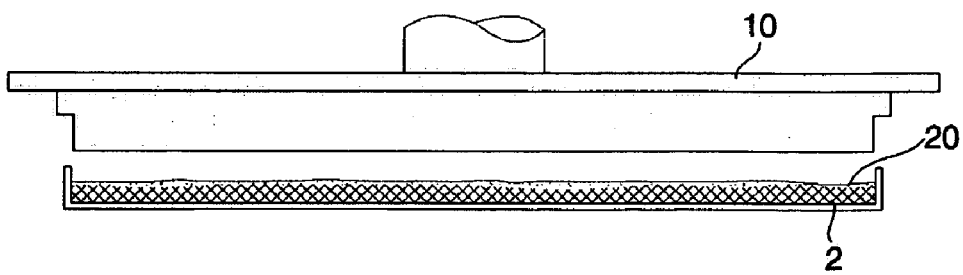
FIGS. 2 to 6 are diagrams illustrating respective steps of a method of manufacturing an expanded graphite product according to the present invention.
Figure 3:
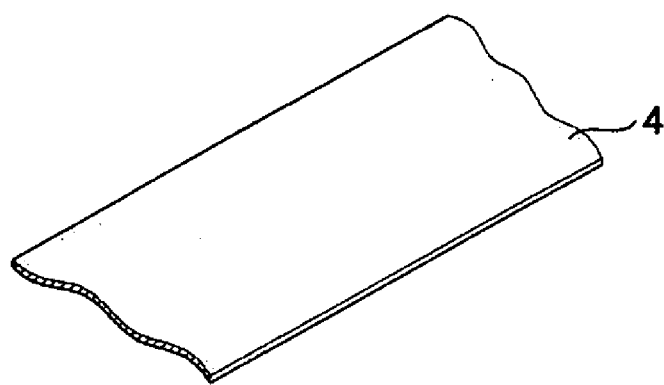

Referring to FIGS. 2 and 3, at the first step, powdered and thinly spread expanded graphite 2 is primarily compressed by a primary press 10 or a roller having a proper capacity to form a high-density graphite thin film 4.

Since the expanded graphite 2 has a significantly low density $1/50 \sim 1/200$ times smaller than that of graphite before expansion and the first step is performed in a very thinly spread state regardless of a thickness of the expanded graphite product, there is no requirement for a high pressure when forming the high density graphite thin film 4. Thus, a relatively low capacity primary press 10 or roller can be used, and the resulting graphite thin film 4 has a high density as well as uniformity.

Meanwhile, during the first step, a binder 20 may be mixed with the thinly spread expansion graphite 2 in order to allow the graphite thin film 4 to have an adhering force.

The binder 20 may be at least one of a polymer-based binder, ceramic-based binder and phosphate-based binder.

Particularly, the polymer-based binder has excellent water resistance. Thus, when the graphite is mixed with the polymer-based binder containing nanosize conductive powder, there can be provided an expanded graphite product having conductivity, such as a seal for shielding electromagnetic waves. Thus, the polymer-based binder can be widely applied in the industry.

Figure 4:
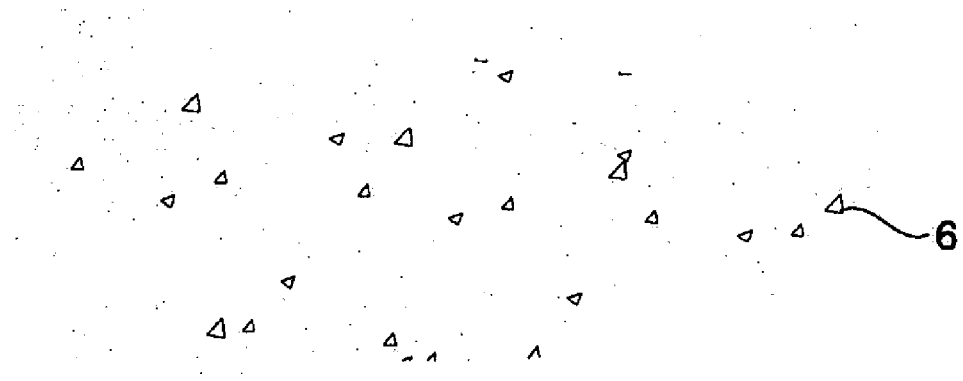

Referring to FIGS. 3 and 4, at the second step, the relatively large area graphite thin film 4 of a sheet shape is milled into graphite flakes 6.

The graphite flakes 6 are formed by cutting the graphite thin film 4 into a stripe shape or a rectangular shape using a cutter or by breaking the graphite thin film 4 into an irregular shape using a mechanical milling method.

Figure 5:
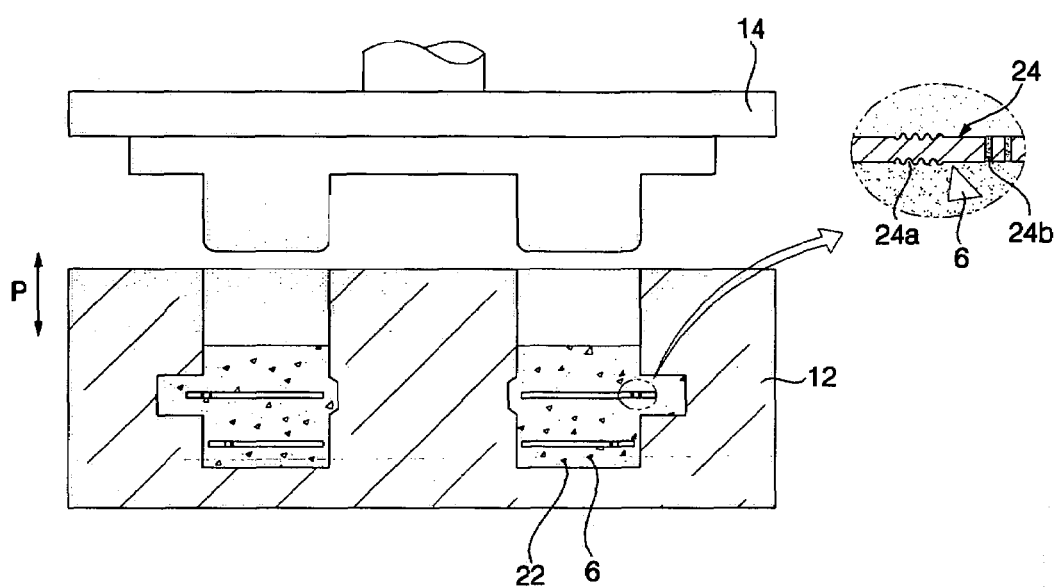
Figure 6:
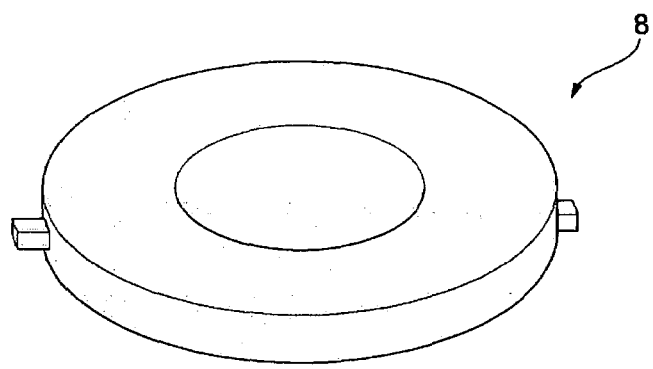

Referring to FIGS. 5 and 6, at the third step, after filling a mold 12 having a predetermined shape, such as a ring shape, with the graphite flakes 6, the graphite flakes 6 are secondarily compressed by a secondary press 12, thereby forming an expanded graphite product 8 having a predetermined shape.

Here, since the binder is contained in the graphite flakes 6, when the graphite flakes 6 are compressed by the secondary press 14, the graphite flakes 6 are adhered and firmly bound to each other, so that the shape of the expanded graphite product can be maintained after compression. Naturally, the binder (not shown) may be added to the graphite flakes 6 in the mold 12 in this step.

Meanwhile, when filling the mold 12 with the graphite flakes 6, a fibrous material 22, such as carbon fiber, Kevlar or the like, which has a heat expansion coefficient similar to that of the graphite, can be mixed thereto. Then, when the graphite flakes 6 are secondarily compressed by the second press 14, the fibrous material 22, such as carbon fiber, Kevlar or the like, is closely bound to each other in the graphite flakes 6, so that the expanded graphite product 8 may have more enhanced mechanical properties.

Further, at least one or more metallic sheets 24 are interposed in the graphite flakes 6 of the mold 12 in the direction of compression of the second press 14 as indicated by arrow P. Then, the expanded graphite product 8 is reinforced with the metallic sheets 24.

Two or more metallic sheets 24 may be laminated in the graphite flakes 6 to be spaced with each other by a predetermined height in the direction of compression (indicated by an arrow P) of the second press 14. Otherwise, one metallic sheet 24 may be interposed in the graphite flakes 6. Further, metallic sheets 24 may be respectively disposed at opposite sides of the graphite flake 6 laminated to a predetermined height.

The metallic sheets 24 are made of a material, such as stainless, steel or non-ferrous metal, so as to enhance the mechanical properties of the expanded graphite product 8.

Additionally, the metallic sheets 24 are firmly bound to the graphite flake 6 by the binder, and may formed with at least one hole or irregular portion 24a so that the metallic sheets 24 may have a contact area with the graphite flake 6 as wide as possible in order to enhance a binding force.

As the last step, the expanded graphite product formed through the above procedures is more precisely machined through additional mechanical process such as rolling or spinning in order to enhance marketability.

Figure 7:
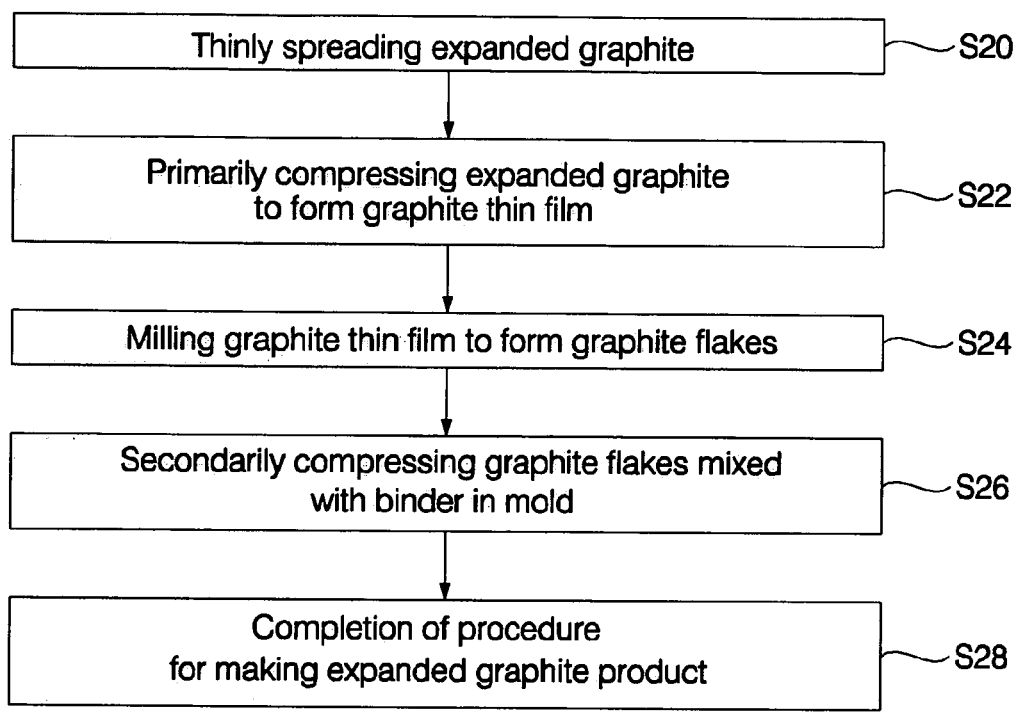
FIG. 7 is a flow chart of a method of manufacturing an expanded graphite product according to another embodiment of the present invention.

FIG. 7 is a flow chart of a method of manufacturing an expanded graphite product according to another embodiment of the present invention.

The method of manufacturing the expanded graphite product according to another embodiment of the present invention will be briefly described. At first, the expanded graphite 2 is thinly spread (S20), and is then primarily compressed using a press or a roller, thereby forming a high-density graphite thin film (S22). Then, the expanded graphite is milled into graphite flakes (S24). After the graphite flakes are filled into a mold having a predetermined shape and binder is applied to the graphite flakes, the graphite flakes are compressed by the press (S26), thereby completing the expanded graphite product (S28).

INDUSTRIAL APPLICABILITY

As described above, in accordance with the method of manufacturing the expanded graphite product of the present invention, the thinly spread expanded graphite is primarily compressed into the high-density graphite thin film and milled. Then, the milled high-density graphite thin film is filled into the mold having the predetermined shape and secondarily compressed, thereby forming the expanded graphite product. As a result, there are provided advantageous effects that as the density of the expanded graphite product increases through respective manufacturing steps, not only are initial equipment costs reduced due to minimized equipment, but also an expanded graphite product having a uniform density and a closely packed structure is provided. Additionally, since the expanded graphite product is finally compressed in the mold, the expanded graphite product does not have directional preference and can be formed into various shapes.

Further, the polymer-based binder, ceramic-based binder and phosphate-based binder can be used in the present invention, so that the shape of the expanded graphite product can be maintained after forming. Particularly in case of the polymer-based binder, there is an advantageous effect in that not only does the polymer-based binder have excellent water resistance, but it also can be used for products requiring conductivity by mixing the nanosize conductive powder thereto.

Further, the expanded graphite product can have enhanced mechanical properties by mixing the fibrous material into the graphite flakes in the mold.

Further, the expanded graphite product can have enhanced mechanical properties by compressing the graphite flakes in a state that the metallic sheet for reinforcement is interposed in the graphite flakes.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

The invention claimed is:

1. A method of manufacturing expanded graphite products, comprising the steps of:
   a) compressing powdered expanded graphite to form a graphite thin film;
   b) milling the graphite thin film to form graphite flakes; and
   c) putting the graphite flakes into a mold and compressing the graphite flakes to form a predetermined shape of an expanded graphite product,
   wherein during at least one of the steps a), b) and c), a binder is mixed into the graphite.

2. The method as set forth in claim 1, wherein the binder is mixed during the step a) and the step c).

3. The method as set forth in claim 2, wherein the binder is at least one of a polymer-based binder, ceramic-based binder or phosphate-based binder.

4. The method as set forth in claim 3, wherein the polymer-based binder further comprises a conductive material.

5. The method as set forth in claim 1, wherein in the step c), at least one or more metallic sheets are put together with the graphite flakes into the mold.

6. The method as set forth in claim 5, wherein the metallic sheets have one or more uneven portions.

7. The method as set forth in claim 5, wherein the metallic sheets have one or more holes.

8. The method as set forth in claim 5, wherein during the step c), a fibrous material is added to the graphite flakes in the mold.

9. The method as set forth in claim 5, wherein the metallic sheets are put into the mold such that a surface of each of the metallic sheets is placed perpendicular to the direction of compression.

* * * * *